Patented Apr. 11, 1939

2,153,620

UNITED STATES PATENT OFFICE 2,153,620

COLORING MATTERS OF PHTHALOCYANINE TYPE

Isidor Morris Heilbron, Manchester, England, Francis Irving, Grangemouth, Scotland, and Reginald Patrick Linstead, London, England, assignors to Imperial Chemical Industries Limited, a corporation of Great Britain No Drawing. Original application November 15, 1933, Serial No. 698,216. Divided and this application May 14, 1936, Serial No. 79,812. In Great Britain November 16, 1932

3 Claims. (Cl. 260—319)

This application relates to the manufacture of coloring matters of the phthalocyanine series, and constitutes a division of our copending application, Serial No. 698,216, filed November 15, 1933, Patent 2,116,602, May 10, 1938.

It is an object of this invention to provide an improved process for the manufacture of coloring matters of the phthalocyanine series, especially those which do not contain combined metal. Other and further important objects of this invention will appear as the description proceeds.

In British patent specification No. 322,169 there is described a process for the production of blue to green coloring matters by heating of phthalic anhydride with ammonia and certain metals or metal compounds including iron, cuprous chloride and nickel sulphide. In British patent specification No. 389,842, (corresponding to U. S. Patent No. 2,000,051) there is described a process for the production of nitrogen-containing coloring matters of complex constitution which comprises heating an o-cyanoarylcarboxyamide in the presence of specified metals and metal compounds. These coloring matters are described as purple to green in color and stated to appear to belong to one general class, this class appearing to include the said coloring matters of British patent specification No. 322,169. British patent specification No. 389,842 also describes the production of metal-free coloring matters and gives probable formulae for a coloring matter containing magnesium and the corresponding metal-free coloring matter.

British patent specification No. 390,149 (corresponding to U. S. Patent No. 2,000,052) describes the production of the same coloring matter containing magnesium and the corresponding metal-free coloring matter and of substituted derivatives of these by heating a phthalimide with ammonia and magnesium or antimony.

As described in the last mentioned patent, the metal-free compound may be produced either directly by heating a phthalimide with antimony, or indirectly, that is by first heating the phthalimide with magnesium to produce a magnesium-containing compound, and then eliminating the magnesium by recrystallization from concentrated sulfuric acid.

We have now found that coloring matters of the same general series but which contain no combined metal can be readily obtained by a simple treatment of o-arylene dicyanides. For instance, a blue-green coloring matter is obtained by heating phthalonitrile purified by being twice recrystallized from ethyl alcohol to about 350°. This coloring matter is obtained more readily if the phthalonitrile has not been recrystallized or if heating is done in the presence of a nitrogenous base such as ammonia or an organic base. We have also found that substituted phthalonitriles and o-dinitriles of naphthalene and anthracene may be used instead of phthalonitrile. The so-obtained coloring matters are typically blue to green in shade, have only slight solubility in organic solvents, but dissolve in concentrated sulfuric acid and are decomposed by nitric acid. They contain nitrogen, are of complex constitution and where a metal or metal compound of the above series has been used in their manufacture, they may consist in part of a compound containing said metal in combined form.

The coloring matters obtained by our new process therefore appear substantially identical with the coloring matter obtained from phthalimide and magnesium, followed by recrystallization from sulfuric acid, as more fully described and claimed in U. S. Patent No. 2,000,052. In general, therefore, our invention is that of a new process which comprises chemically combining molecules of an o-arylene dicyanide to give coloring matters containing nitrogen and of complex constitution.

Combination is preferably effected by submitting the o-arylene dicyanide to the action of heat preferably with the addition of a liquid tertiary organic base, such as pyridine or quinoline, and in an atmosphere of ammonia.

Working according to this new process the coloring matters are, generally speaking, formed with greater readiness than according to those of the above-mentioned specifications and higher yields, in some cases nearly the theoretical are obtained. Purification may be effected as already described in the said specification.

The coloring matters may be employed as pigments. For instance, they may be made into lakes with the usual substrata. Such lakes may be used as coloring matters for varnishes and inks.

The following examples in which parts are by weight illustrate but do not limit the invention.

Example 1

Pure phthalonitrile (twice recrystallized from ethyl alcohol) is heated at 350 to 360° C. in a sealed vessel for seven hours. After cooling, the contents of the vessel are finely ground, extracted with boiling acetone, and purified from sulfuric acid. A pigment which appears to be a metal-free compound is obtained.

Example 2

A solution of 2 parts of phthalonitrile in 5.5 parts of quinoline is heated to 250° C. and then a steady stream of ammonia gas passed into the solution for three hours or longer, the temperature being kept at about 250° C., the mixture is then filtered hot, and the residue washed or extracted with alcohol and acetone until free from colorless material. A residue of glistening purple needles remains, which on powdering breaks down to a pure blue. This appears to be the metal-free coloring matter.

Example 3

A solution of 2 parts of phthalonitrile in 9.6 parts of dimethylaniline is heated at or just below 250° C. for five hours, while a stream of ammonia gas is passed in. After cooling, the pigment is filtered off, and extracted with an organic solvent to remove soluble impurities. The product appears to be the same as that of Example 2.

Example 4

Phthalonitrile is heated in an atmosphere of ammonia for several hours at a temperature of 260° C. A blue pigment is obtained together with a pale yellow substance, rather sparingly soluble in glacial acetic acid (m. p. 308 to 309° C.).

Phthalonitrile may be prepared by the process of copending application Serial No. 706,150 (now Patent No. 2,054,088, dated Sept. 15, 1936) or in any other suitable manner.

It will be understood that our invention is susceptible of wide variation and modification without departing from the spirit thereof, as defined by the subjoined claims.

We claim:

1. The process of producing metal-free phthalocyanine which consists of heating phthalonitrile in an atmosphere of ammonia, and recovering the solid bluish pigment thus obtained.

2. The process of producing metal-free phthalocyanine, which consists of heating phthalonitrile, dissolved in a liquid organic base while passing over the reaction mass a stream of gaseous ammonia.

3. The process of producing metal-free phthalocyanine, which consists of heating phthalonitrile, dissolved in a liquid tertiary organic base at a temperature of about 250 to 260° C. while passing over the reaction mass a stream of gaseous ammonia, until the formation of a solid, colored precipitate, separating said precipitate and extracting the same with an organic solvent to remove soluble impurities.

ISIDOR MORRIS HEILBRON.
FRANCIS IRVING.
REGINALD PATRICK LINSTEAD.